(12) United States Patent
Han et al.

(10) Patent No.: US 10,091,048 B2
(45) Date of Patent: Oct. 2, 2018

(54) METHOD AND APPARATUS FOR RESOLVING IP ADDRESS COLLISION IN REMOTE ACCESS SERVICE

(75) Inventors: Se-Hee Han, Seoul (KR); Joo-Yeol Lee, Seoul (KR); Dong-Shin Jung, Suwon-si (KR); Fei Fei Feng, Suwon-si (KR); Je-Young Maeng, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 479 days.

(21) Appl. No.: 12/578,136

(22) Filed: Oct. 13, 2009

(65) Prior Publication Data

US 2010/0094954 A1 Apr. 15, 2010

(30) Foreign Application Priority Data

Oct. 10, 2008 (KR) .................. 10-2008-0099766
Jul. 10, 2009 (KR) .................. 10-2009-0063210
Oct. 9, 2009 (KR) .................. 10-2009-0096116

(51) Int. Cl.
*G06F 15/16* (2006.01)
*H04L 29/12* (2006.01)
*H04L 29/08* (2006.01)

(52) U.S. Cl.
CPC ...... *H04L 29/12424* (2013.01); *H04L 29/125* (2013.01); *H04L 29/12264* (2013.01); *H04L 61/2046* (2013.01); *H04L 61/2535* (2013.01); *H04L 61/2564* (2013.01); *H04L 67/025* (2013.01)

(58) Field of Classification Search
CPC ............. H04L 61/2015; H04L 61/2046; H04L 61/2061

USPC ........................................................ 709/219
See application file for complete search history.

(56) References Cited

U.S. PATENT DOCUMENTS

| | | | |
|---|---|---|---|
| 6,393,488 B1 * | 5/2002 | Araujo ......................... | 709/245 |
| 6,629,145 B1 | 9/2003 | Pham et al. | |
| 6,687,755 B1 * | 2/2004 | Ford et al. .................... | 709/245 |

(Continued)

FOREIGN PATENT DOCUMENTS

| CN | 1921424 | 2/2007 |
|---|---|---|
| KR | 1020040005464 | 1/2004 |

(Continued)

OTHER PUBLICATIONS

Allegro et al., UPnP Device Architecture 1.0, Apr. 24, 2008.*

(Continued)

*Primary Examiner* — James E Springer
(74) *Attorney, Agent, or Firm* — The Farrell Law Firm, P.C.

(57) ABSTRACT

A method is provided for resolving a collision of Internet Protocol (IP) addresses between devices connected to a first server and a second server remotely accessed in a Universal Plug and Play (UPnP) remote access service. The second server receives address information of a network of the first server from the first server. The second server compares address information of a network of the second server with the received address information of the network of the first server, and determines whether a collision has occurred between addresses of the first server and the second server. A collided address is changed when the collision has occurred.

12 Claims, 9 Drawing Sheets

(56) References Cited

U.S. PATENT DOCUMENTS

| | | | |
|---|---|---|---|
| 7,836,155 B2* | 11/2010 | Kang | H04L 29/12264 370/389 |
| 8,050,282 B2* | 11/2011 | Cho | H04L 12/2818 370/401 |
| 2002/0099937 A1* | 7/2002 | Tuomenoksa | H04L 12/2602 713/153 |
| 2003/0158962 A1* | 8/2003 | Keane | H04L 12/4641 709/238 |
| 2003/0161295 A1 | 8/2003 | Shah et al. | |
| 2003/0225900 A1 | 12/2003 | Morishige et al. | |
| 2004/0218611 A1* | 11/2004 | Kim | H04L 12/4633 370/401 |
| 2005/0066035 A1* | 3/2005 | Williams et al. | 709/226 |
| 2006/0031459 A1 | 2/2006 | Ahn et al. | |
| 2006/0075123 A1* | 4/2006 | Burr et al. | 709/228 |
| 2006/0227780 A1* | 10/2006 | Inouchi | H04L 12/4641 370/389 |
| 2006/0235997 A1 | 10/2006 | Munirajan et al. | |
| 2007/0097977 A1* | 5/2007 | Boden | H04L 12/4641 370/392 |
| 2007/0140239 A1* | 6/2007 | Bauer et al. | 370/389 |
| 2007/0233845 A1 | 10/2007 | Song et al. | |
| 2007/0244578 A1* | 10/2007 | Stirbu | 700/65 |
| 2008/0002727 A1* | 1/2008 | Yamane | H04L 12/1836 370/401 |
| 2008/0212495 A1* | 9/2008 | Stirbu | 370/254 |
| 2008/0250123 A1 | 10/2008 | Chae et al. | |
| 2008/0298367 A1* | 12/2008 | Furukawa | 370/392 |
| 2008/0301216 A1* | 12/2008 | Han | H04L 12/2818 709/202 |
| 2009/0016360 A1* | 1/2009 | Kurita | H04L 12/4633 370/397 |
| 2009/0080453 A1* | 3/2009 | Stirbu | 370/433 |
| 2009/0222559 A1* | 9/2009 | Anipko | H04L 29/1232 709/225 |
| 2009/0240785 A1* | 9/2009 | Kikkawa | 709/218 |
| 2009/0245266 A1* | 10/2009 | Cho et al. | 370/401 |
| 2009/0259740 A1* | 10/2009 | Hepburn | H04L 29/12264 709/223 |
| 2010/0077064 A1* | 3/2010 | Viger et al. | 709/221 |
| 2010/0115074 A1* | 5/2010 | Tapiola | H04L 12/12 709/223 |
| 2010/0191829 A1* | 7/2010 | Cagenius | 709/219 |
| 2011/0002341 A1* | 1/2011 | Damola | H04L 63/0823 370/401 |
| 2011/0013641 A1* | 1/2011 | Kolhi | H04L 12/4633 370/401 |
| 2011/0026537 A1* | 2/2011 | Kolhi | H04L 12/4633 370/401 |
| 2011/0185232 A1* | 7/2011 | Soundararajan | 714/27 |
| 2012/0079053 A1* | 3/2012 | Wu | H04L 12/2834 709/207 |

FOREIGN PATENT DOCUMENTS

| | | | | |
|---|---|---|---|---|
| WO | WO 2007/063408 | | 6/2007 | |
| WO | WO 2007/072254 | | 6/2007 | |
| WO | WO 2007/110754 | | 10/2007 | |
| WO | WO 2007/142485 | | 12/2007 | |
| WO | WO 2008/088259 | * | 7/2008 | H04L 29/06 |
| WO | WO 2008/090519 | | 7/2008 | |

OTHER PUBLICATIONS

Wikipedia, Subnetwork, Nov. 28, 2016, https://en.wikipedia.org/wiki/Subnetwork.*

Petros Belimpasakis et al., "Remote Access to Universal Plug and Play (UPnP) Devices Utilizing the Atom Publishing Protocol", Third International Conference on Networking and Services (ICNS'07), Jun. 19, 2007.

UPnP Forum: "Remote Access Architecture: 1", Internet Citation, Sep. 30, 2009.

Korean Office Action dated Aug. 10, 2015 issued in counterpart application No. 10-2009-0096116, 7 pages.

* cited by examiner

METHOD AND APPARATUS FOR RESOLVING IP ADDRESS COLLISION IN REMOTE ACCESS SERVICE

PRIORITY

This application claims priority under 35 U.S.C. § 119(a) to a Korean Patent Application filed in the Korean Intellectual Property Office on Oct. 10, 2008 and assigned Serial No. 10-2008-0099766, a Korean Patent Application filed in the Korean Intellectual Property Office on Jul. 10, 2009 and assigned Serial No. 10-2009-0063210, and a Korean Patent Application filed in the Korean Intellectual Property Office on Oct. 9, 2009 and assigned Serial No. 10-2009-0096116, the entire disclosures of which are incorporated herein by reference.

BACKGROUND OF THE INVENTION

1. Field of the Invention

The present invention relates generally to conflicts involving remote access service, and more particularly, to a method and apparatus for solving an Internet Protocol (IP) address collision between a device in a home network and a device in a remote network in a remote access service that uses Universal Plug and Play (UPnP), which is a middleware protocol for a home network.

2. Description of the Related Art

A home network generally consists of IP-based private networks. The home network is capable of connecting different types of devices that are used in a home to one network. The devices are connected through a common virtual computing environment called "middleware." The home network is also capable of controlling these devices. Examples of the types of devices used in a home include, for example, Personal Computers (PCs), intelligent products and wireless devices.

The term "middleware" refers to software that connects various digital devices on a peer-to-peer basis and enables communication between the devices. Various types of technology, such as Home AV Interoperability (HAVE), UPnP, Java Intelligent Network Infra-structure (JIM), and Home Wide Web (HWW), have been proposed as middleware.

Since the addition of Plug and Play (PnP) functions to current PC operating systems, it has been very easy to install and set peripheral devices. UPnP, which has evolved from PnP, enables various home appliances and network devices, such as network printers and Internet gates, to perform networking, especially home networking. The convenient functions of UPnP are provided to the entire network based on Internet standard technologies, such as Transmission Control Protocol/Internet Protocol. (TCP/IP), Hyper Text Transfer Protocol (HTTP), and eXtensible Markup Language (XML).

A UPnP network consists of Controlled Devices (CDs), which are connected to and controlled by an IP-based home network, and Control Points (CPs) for controlling the CDs. The UPnP network performs communication between the CPs and the CDs using a UPnP protocol stack structure that includes Internet protocols such as TCP/IP and HTTP, and technologies such as XML and Simple Object Access Protocol (SOAP).

In an addressing step of performing communication between the CPs and the CDs, a CP and a CD have their own individual IP addresses. Upon joining the network, the CD fetches its IP address using a Dynamic Host Configuration Protocol (DHCP), or is assigned an IP address using automatic IP addressing if there is no DHCP server in the network.

In a discovery step, the CP discovers the CD, or the CD advertises its location. The discovery step is performed using a Simple Service Discovery Protocol (SSDP). If the CD is added to the network, the CD delivers an SSDP alive message to the network by IP multicasting. The CP can then determine the presence/absence of the CD by receiving the alive message. When the CP newly joins the network, the CP multicasts an SSDP Multicast-search (M-search) message to the network. All of the CDs, which checked the M-search message, then send M-search response messages containing their own information to the CP.

In a description step, the CP checks the description content of the CD. When the CP wants the CD after checking the response message, the CP may send to the CD a request for detailed information related to the CD. The CD, which has received the request, sends its information in an XML document.

In a control step, the CP operates the CD by controlling a function of the CD. When the CP intends to control an arbitrary CD, the CP sends a desired service to the CD using SOAP, based on the detailed information related to the CD. SOAP is a protocol that is written on HTTP by XML for the purpose of invoking (or calling) a remote function.

In an eventing step, the CP receives an event change of the CD. The CP sends a subscribe request for a relevant event to the CD when the CP wants to receive an event message from the CD. If the subscription is successful, the CD sends an event message to the CP using General Event Notification Architecture (GENA).

In a presentation step, the CP presents a state of the CD using a Hyper Text Markup Language (HTML) of the CD.

Based on the UPnP basic control method (UPnP device architecture), a UPnP CD can provide various services (or functions) to the CP. For example, based on the UPnP basic control method, a UPnP CP can control a UPnP CD in which Audio/Visual (A/V) content is stored, so that the A/V content can be played back in other UPnP CDs. When the UPnP CD is a gateway, the UPnP CP can change and set an IP address band and addresses of a subnet and a gateway, to be assigned to devices in the home, by controlling the UPnP gateway or CD. In addition, a remote access service can be provided that can remotely access a UPnP home network.

Figure 1:
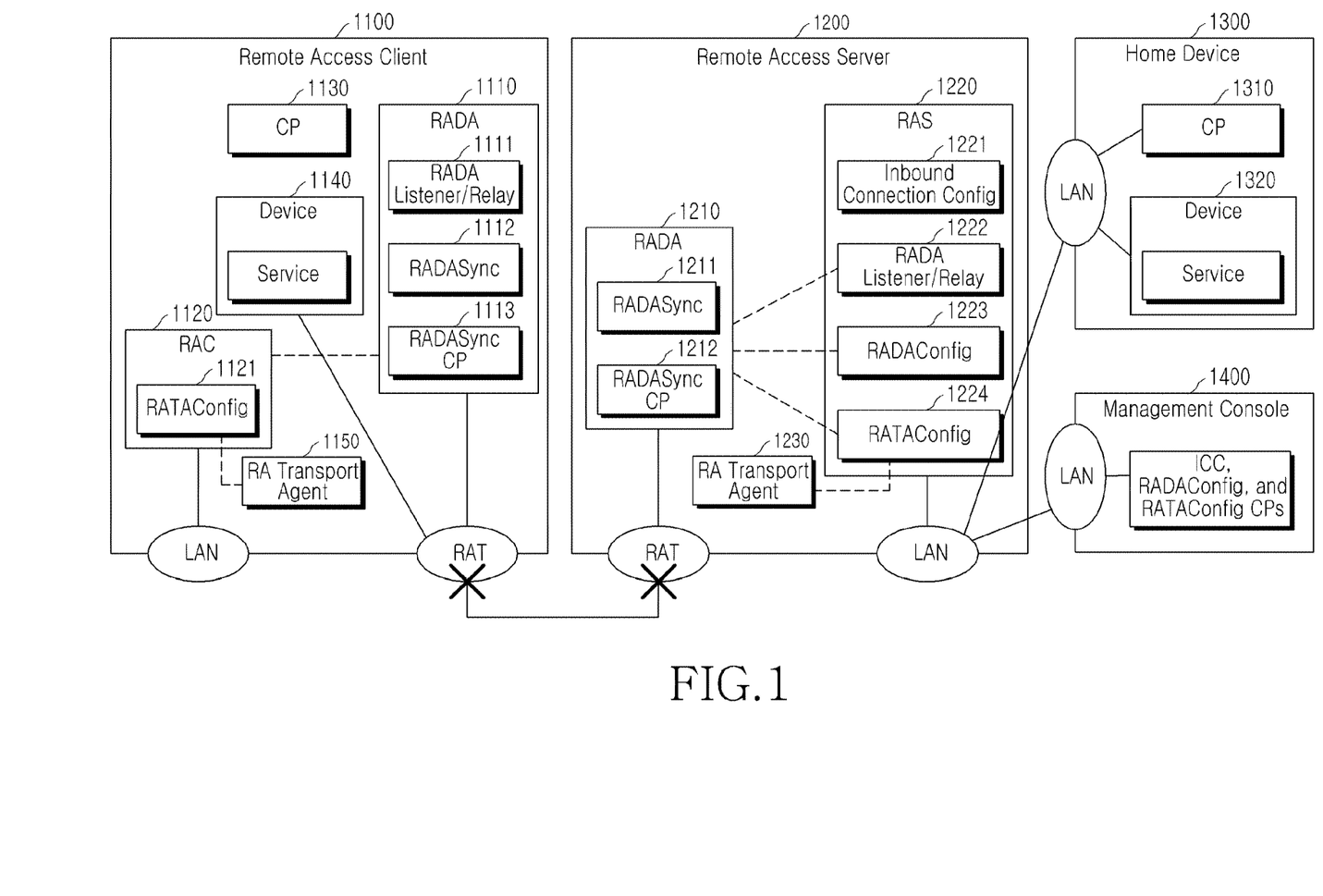
FIG. 1 is a block diagram illustrating a conventional UPnP remote access architecture.

FIG. 1 is a block diagram illustrating a conventional UPnP remote access architecture. The UPnP remote access architecture shown in FIG. 1 is provided in accordance with Remote Access Architecture v1.0 of UPnP Forum.

Referring to FIG. 1, a remote access client 1100 includes a CP 1130, a Remote Access Discovery Agent (RADA) 1110, a UPnP Remote Access Client device (RAC) 1120, a UPnP device 1140, and a Remote Access Transport Agent (RATA) 1150. A remote access server 1200 includes an RADA 1210, an UPnP Remote Access Server device (RAS) 1220, and an RATA 1230. A home, device 1300 and a management console 1400 are connected to the remote access server 1200 over a LAN.

The RAC 1120 and the RADA 1110 in the remote access client 1100, and the RAS 1220 and the RADA 1210 in the remote access server 1200 represent UPnP devices. An RADASync CP 1113 and an RADASync CP 1212 represent remote access-related UPnP CPs, and an RADASync 1112, an RATAConfig 1224, an RADASync 1211, an RATAConfig 1223, an RATAConfig 1121 and an Inbound Connection Config 1221 represent remote access-related UPnP services. An RADA Listener/Relay 1222 and an RADA Listener/Relay 1111 are support components of RADA, and the CP 1130, the device 1140, CP 1310 and device 1320 represent a UPnP CP, a device and a service that are not related to remote access.

The current basic UPnP architecture v1.0 operates based on SSDP in UPnP device discovery, and SSDP is a protocol that uses IP multicast. However, since the current IP multicast cannot guarantee normal operations over the Internet, its control of the UPnP device over the Internet is also impossible. Therefore, a UPnP remote access architecture has been proposed that enables a UPnP device or a CP device to operate as if it physically exists in a home network even when the device is located over the Internet.

The UPnP remote access architecture, as shown in FIG. 1, has defined the UPnP remote access server 1200, the UPnP remote access client 1100, and the UPnP RADA devices 1110 and 1210, and generates Remote Access Transport (RAT) channels through the RATAs 1150 and 1230. The physical remote access server 1200 and remote access client 1100 include the UPnP RADAs 1110 and 1210 in common, and include the UPnP RAC 1120 and the UPnP RAS 1220, respectively.

The UPnP RADA devices 1110 and 1210 synchronize a list of UPnP devices operating in a home network to which the remote access server 1200 belongs, with a list of UPnP devices in the remote access client 1100 by means of their RADASync services 1112 and 1211 and RADASync CPs 1113 and 1212. The UPnP RADA devices 1110 and 1210 handle an SSDP message so that UPnP CP devices in their home network may discover UPnP devices in the remote network. A UPnP CP device, which has discovered a UPnP device in the remote network, sends a control message to access a service provided by the discovered device, and this message is directly delivered to the UPnP device in the remote network over a transport channel.

Figure 2:
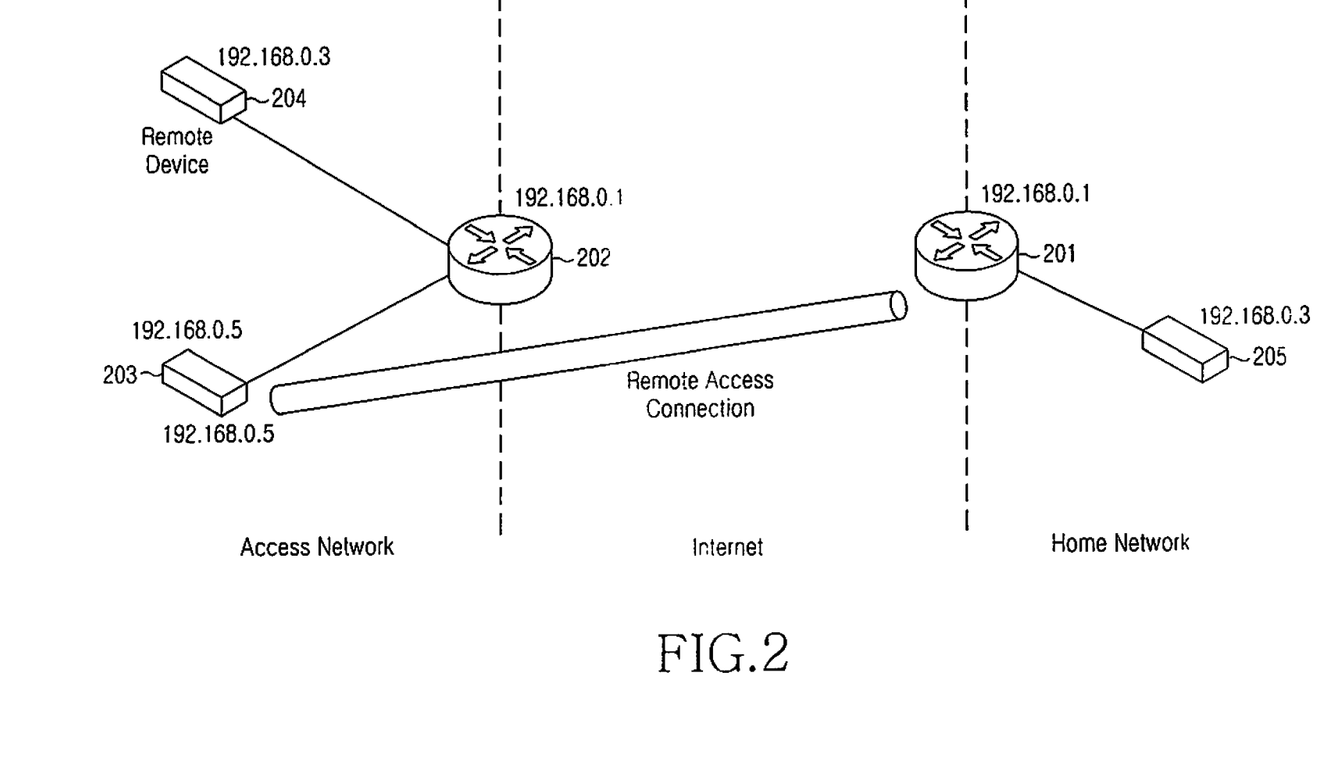
FIG. 2 is a diagram illustrating a collision between UPnP devices due to use of the same IP address during a UPnP remote access service.

FIG. 2 is a diagram illustrating a collision between UPnP devices due to use of the same IP address during a UPnP remote access service. The UPnP remote access architecture described in FIG. 1 cannot normally operate in the remote access situation shown in FIG. 2. Referring to FIG. 2, a remote access server is assumed to be located in a gateway 201, and a remote access client 203 is located in a remote network of a gateway 202. The remote access client 203 can acquire information about a UPnP device 205 operating in a home network by means of the UPnP remote access architecture. The remote access client 203, which acquired information about the UPnP device 205, intends to send a control message to access a service of the UPnP device 205 in the home network. However, if a device 204, having the same IP address as that of the UPnP device 205, exists in the network to which the remote access client 203 belongs, the remote access client 203 may not be capable of determining where to send the message.

Generally, in order to solve IP address collision, a Network Address Translation (NAT) device may be provided in the remote access server or the remote access client to replace the collided IP address with non-collided IP address. However, when an IP address collision has occurred between the remote access server and the remote access client under the UPnP remote access environment, it is not possible to deliver information about the collided IP address.

The NAT commonly translates a source IP, address or a destination IP address in an IP packet header into a mechanically different value despite delivery of the IP collision information. Thus, the NAT should translate an IP address value (e.g., an IP address value of a UPnP device that is included in a URL of an SSDP header) in a payload of the IP packet using an Application Level Gateway (ALG). An operation is needed that parses not only the IP header but also the IP payload for all packets passing through an RA connection, and also finds and translates the necessary parts. In order to perform this operation, the remote access client or the remote access server consumes an undesirable amount of resources.

SUMMARY OF THE INVENTION

The present invention is to address at least the above problems and/or disadvantages and to provide at least the advantages described below. Accordingly, an aspect of the present invention provides a method and apparatus for solving an IP collision between a device in a remote network and a device connected to a remote access server in a UPnP remote access environment.

According to one aspect of the present invention, a method is provided for resolving a collision of Internet Protocol (IP) addresses between devices connected to a first server and a second server remotely accessed in a Universal Plug and Play (UPnP) remote access service. The second server receives address information of a network of the first server from the first server. The second server compares address information of a network of the second server with the received address information of the network of the first server, and determines whether a collision has occurred between addresses of the first server and the second server. A collided address is changed when the collision has occurred.

According to another aspect of the present invention, a method is provided for resolving a collision of Internet Protocol (IP) addresses between devices connected to a first server and a second server remotely accessed in a Universal Plug and Play (UPnP) remote access service. The first server generates a Remote Access Transport (RAT) channel to the second server. The first server acquires a Device Description Document (DDD) of the second server through the UPnP remote access service. The first server transmits a subnet address and a translated subnet address list of a network of the first server to the second server.

According to a further aspect of the present invention, a server is provided for resolving a collision of Internet Protocol (IP) addresses between devices connected to servers remotely accessed in a Universal Plug and Play (UPnP) remote access service. The server includes a Remote Access Discovery Agent (RADA) for receiving address information of a network of a remote server from the remote server, comparing address information of the network of the server with the received address information of the network of the remote server, and determining whether a collision has occurred between addresses of networks of the server and the remote server. The server also includes a Remote Access Transport Agent (RATA) including an Application Level Gateway (ALG) for changing a collided address when a collision has occurred.

According to an additional aspect of the present invention, a method is provided for resolving a collision of Internet Protocol (IP) addresses between devices connected to a server and a client remotely accessed in a Universal Plug and Play (UPnP) remote access service. The server receives information about an IP address in use in a network to which the client belongs, from the client. The server determines a list of IP addresses in use in a network to which the server belongs, and compares it with the received IP address information of the network to which the client belongs. The server assigns a new IP address to a collided device when a collision of IP addresses has occurred.

According to another aspect of the present invention, a method is provided for resolving a collision of Internet Protocol (IP) addresses between devices connected to a server and a client remotely accessed in a Universal Plug and Play (UPnP) remote access service. The client collects a list of IP addresses in use in a network to which the client belongs. The client transmits the collected list of IP addresses to the remotely accessed server.

According to a further additional aspect of the present invention, a server is provided for resolving a collision of Internet Protocol (IP) addresses between devices connected to a server and a client remotely accessed in a Universal Plug and Play (UPnP) remote access service. The server includes a Remote Access Discovery Agent (RADA) including a RADASync service and a RADASync Control Point (CP) for synchronizing lists of devices connected to the client and devices connected to the server, for collecting information about an IP address in use in a network of the server, receiving IP address information of the client from the client, and comparing 11' address information in use in its network with IP address information of the client. The server also includes a Dynamic Host Configuration Protocol (DHCP) control module for assigning a new IP address to a collided device when a collision of IP addresses has occurred.

Additionally, according to still another aspect of the present invention, a client is provided for resolving a collision of Internet Protocol (IP) addresses between devices connected to a server and the client remotely accessed in a Universal Plug and Play (UPnP) remote access service. The client includes a Remote Access Discovery Agent (RADA) including a RADASync service and a RADASync CP for synchronizing lists of UPnP devices connected to the client and UPnP devices connected to the server, for collecting an IP address list in use in network of the client, and transmitting the collected IP address list to the remotely accessed server.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS
OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 3:
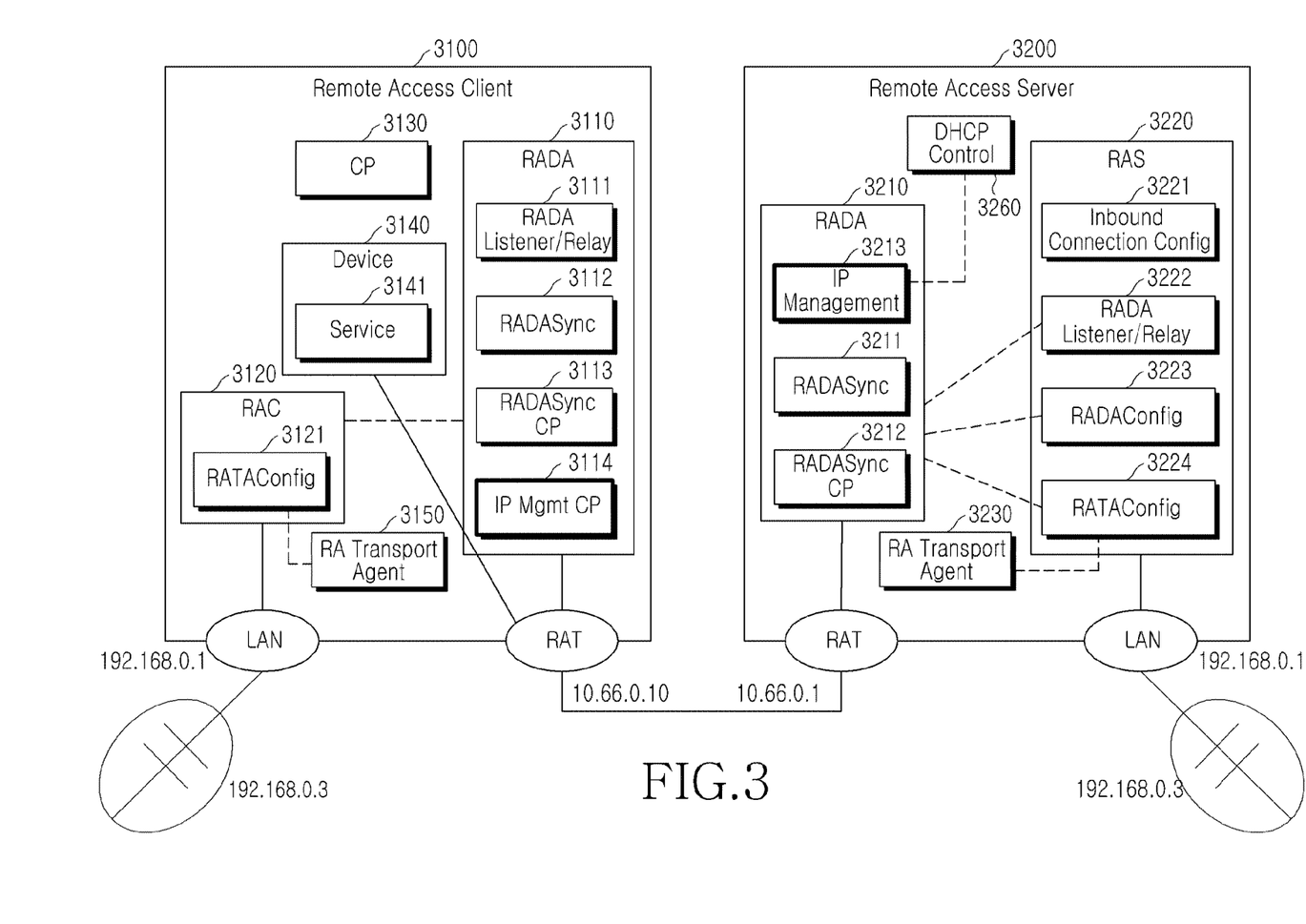
FIG. 3 is a block diagram illustrating a UPnP remote access architecture, according to an embodiment of the present invention.

Referring to FIG. 3, a block diagram illustrates a UPnP remote access architecture, according to an embodiment of the present invention. The UPnP remote access architecture of FIG. 3 includes new structures in addition to those of the conventional UPnP remote access architecture described above with respect to FIG. 1. Thus elements 3130, 3140, 3141, 3120, 3121, 3150, 3110, 3111, 3112, 3113, 3210, 3211, 3212, 3220, 3221, 3222, 3223, 3224 and 3230 function in a manner similar to that of their respective corresponding elements in FIG. 1.

Specifically, a remote access server 3200 includes a UPnP IP Management service 3213 and a DHCP Control module 3260. A remote access client 3100 includes an IP Management Service CP 3114 that accesses the UPnP IP Management service 3213 of the remote access server 3200.

The aforementioned structure is one of many possible examples, and the locations of the IP Management service 3213, the DHCP Control module 3260, and the IP Management Service CP 3114 in the structure may be changed in various ways. A new action may be defined that controls a function provided by the IP Management service 3213 by extending an RADASync service 3211 without separately providing the IP Management service 3213, and the action of the existing RADASync service 3211 may be extended.

Three possible embodiments are described in detail below in accordance with the aforementioned structure.

When an IP Management service is separately defined in accordance with a first embodiment of the present invention, the IP Management Service CP 3114 collects a list of IP addresses that are in use in its network and delivers the list to the IP Management service 3213 in the remote access server 3200. The UPnP IP Management service 3213 also collects a list of IP addresses in use in its network and then determines if there is a collided IP address by comparing it with the IP address list provided from the IP Management CP 3114. The IP Management service 3213 controls the DHCP Control module 3260 to assign another IP address instead of the collided IP address. Routing between a Remote Access Transport (RAT) interface and a Local Area Network (LAN) interface of the remote access server 3200 and the remote access client 3100 is temporarily halted until the IP address collision is completely solved.

When the remote access server 3200 is realized in a gateway device, it can be assumed that the remote access server 3200 is located in the same device as that of a DHCP server. Hence, an RAS 3220 can assign a new IP address to the device having a collided IP address by controlling the DHCP server through invocation of internal interfaces and sending a DHCP FORCERENEW message to a DHCP client.

When the remote access server 3200 operates in a device separate from the gateway device, it is preferable for the gateway device to realize a UPnP Internet Gateway Device (IGD) CP that provides control for the DHCP server. The remote access server 3200 can then control the DHCP server in the gateway device to send a DHCP FORCERENEW message to an IP-collided device using the UPnP IGD CP. The current UPnP IGD device provides control for the DHCP server, but it does not provide an interface that controls sending the DHCP FORCERENEW message.

If reassignment of the collided IP address is completed through the above process, routing between the RAT interface and the LAN interface of the remote access server 3200 and the remote access client 3100 is resumed.

When a RADASync service 3211 is extended in accordance with a second embodiment of the present invention, a new action is added to the RADASync service 3211 and operated in the same way without using an IP Management service 3213. Specifically, a RADASync CP 3113 in the remote access client 3100 invokes a new action, e.g., RegisterUsedIPAddressList( ), defined in the RADASync service 3111. Through the new action, a collided IP address is determined comparing a received IP address list with a list of IP addresses in use in the network to which the remote access server 3200 belongs. The second embodiment then continues in a manner similar to that of the first embodiment after finding out a collided IP address.

When the existing action of the RADASync service 3211 is extended in accordance with a third embodiment of the present invention, the above goal is achieved by extending AddRemoteDevices( ) or the existing action of the RADASync service 3211. Specifically, the remote access server 3200 determines a collided IP address in addition to the existing process through the AddRemoteDevices( ) action.

If there is a collided IP address, the remote access server 3200 may return an error code regarding the AddRemoteDevices( ) action. Upon receipt of the error code, the remote access client 3100 may translate an IP address of a device operating in the network to which the remote access client 3100 belongs, with regard to the collided IP address, and may also request the remote access server 3200 to reassign the collided IP address.

Further, if there is a collided IP address, the remote access server 3200 processes a conventional response to AddRemoteDevices( ) and may internally process the collided IP address without informing the remote access client 3100 of the IP collision.

The operation of collecting a list of IP addresses in use in its network in each of the embodiments is performed according to the following two methods. First, if only the UPnP device exists in the home network, an IP address list that was collected by means of RADA Listeners 3222 and 3111 is generated and used by the UPnP device. If a device that was assigned an IP address from a DHCP server (not shown) exists in the home network aside from the UPnP device, the IP Management-related module acquires from the DHCP server a list of IP addresses of devices to which the DHCP server has assigned IP addresses. The two methods may be used together.

Figure 4:
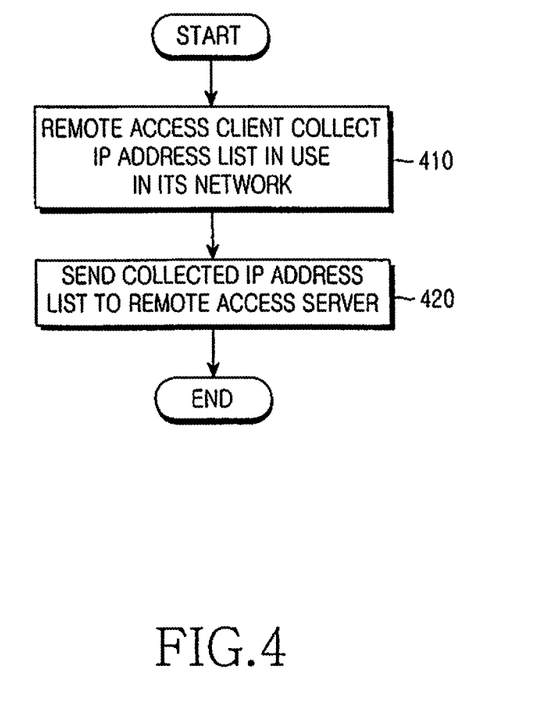
FIG. 4 is a flowchart illustrating an operation of a remote access client for solving a collision of IP addresses during a UPnP remote access service, according to an embodiment of the present invention.

Referring now to FIG. 4, a flowchart illustrates an operation of a remote access client for solving a collision of IP addresses during a UPnP remote access service, according to an embodiment of the present invention.

The remote access client collects a list of IP addresses in use in its network in step 410. In the first embodiment of the present invention, the newly added IP Management CP 3114 may perform the operation of step 410. In the second and third embodiments of the present invention, the existing RADASync CP 3113 may perform the operation of step 410. In step 420, the remote access client transmits the IP address list collected in step 410 to a remote access server.

Figure 5:
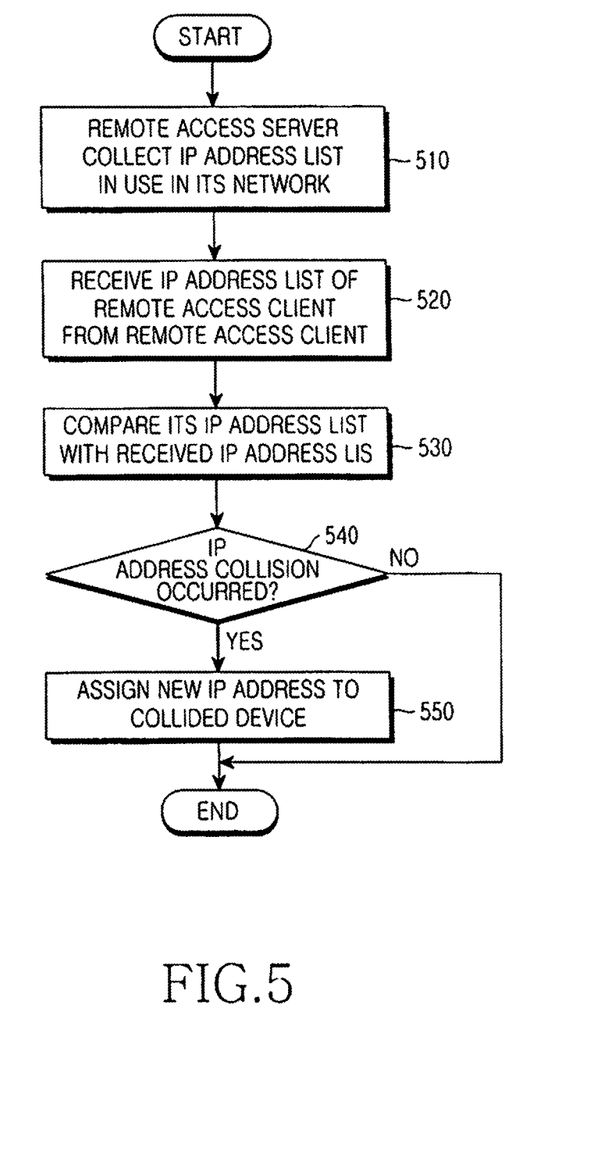
FIG. 5 is a flowchart illustrating an operation of a remote access server for solving a collision of IP addresses during a UPnP remote access service, according to an embodiment of the present invention.

FIG. 5 is a flowchart illustrating an operation of a remote access server for solving a collision of IP addresses during a UPnP remote access service, according to an embodiment of the present invention.

Referring to FIG. 5, in step 510, the remote access server collects a list of IP addresses in use in its network. In step 520, the remote access server receives an IP address list of a remote access client from the remote access client. In step 530, the remote access server compares its own IP address list with the IP address list received in step 520. In step 540, the remote access server determines whether a collision of IP addresses has occurred as a result of the comparison. If a collision of IP addresses has occurred as a result of the comparison, the remote access server assigns a new IP address to the collided device in step 550. If a collision of IP addresses has not occurred in step 540, the remote access server ends the operation. In the first embodiment of the present invention, the newly added IP Management service 3213 may perform the above operation of FIG. 5. In the second embodiment of the present invention, the above operation can be performed by adding a RegisterUsedIPAddressList( ) action to the existing RADASync service 3211 and using the added action. In the third embodiment of the present invention, the above operation can be carried out by extending AddRemoteDevices( ) that is the existing action of the RADASync service 3211.

Figure 6:
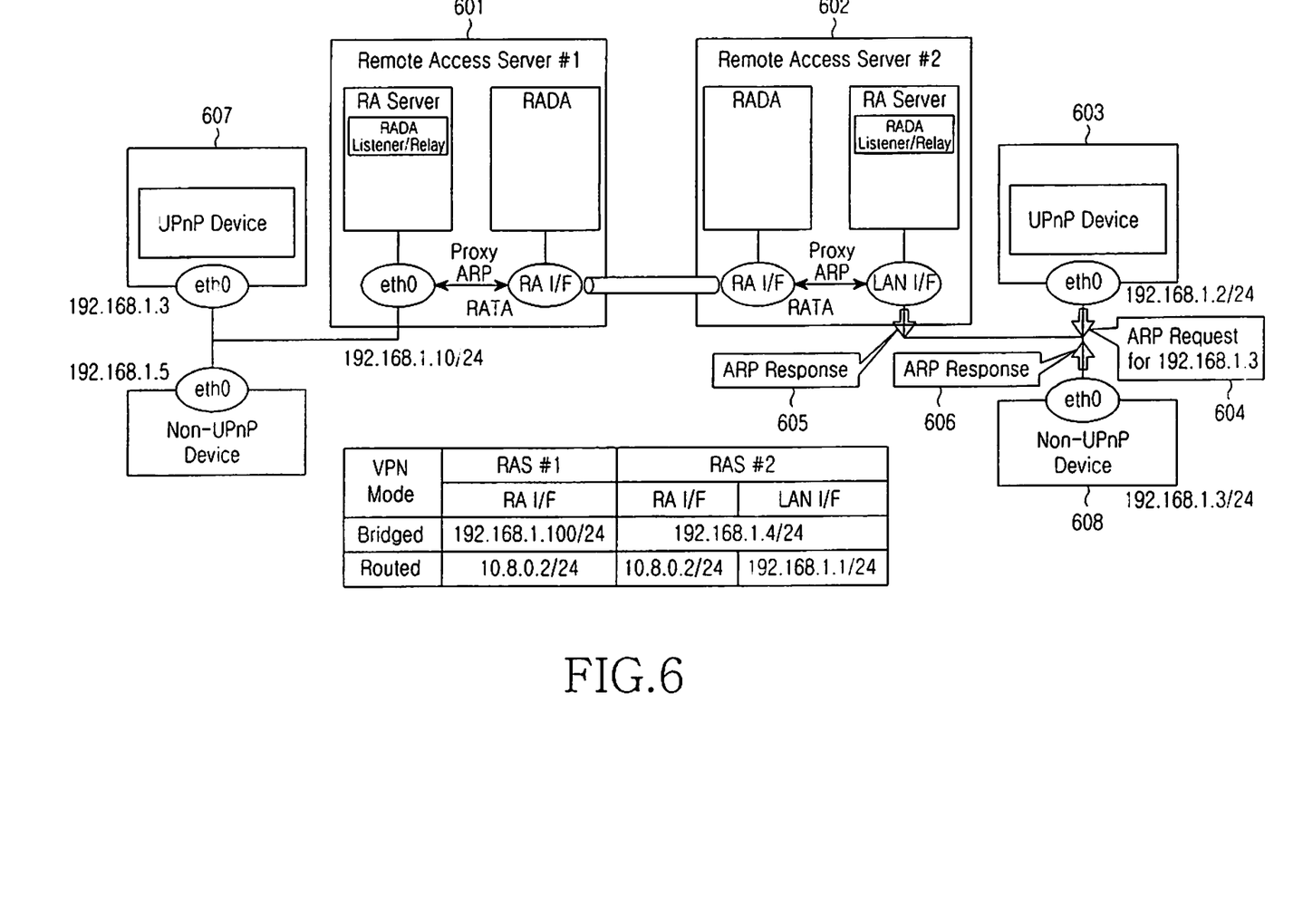
FIG. 6 is a diagram illustrating a collision of IP addresses between devices during a Home-to-Home remote access service.

Referring now to FIG. 6, a diagram illustrates collision of IP addresses between devices during a Home-to-Home remote access service, according to an embodiment of the present invention. In FIG. 6, a first remote access server (hereinafter referred to as a "first server") 601 and a second remote access server (hereinafter referred to as a "second server") 602 are connected by a remote access service. A network to which the first and second servers 601 and 602 in FIG. 6 belong is set as a subnet with a band of 192.168.1.0 (a subnet mask of 255.255.255.0). Network devices 607 and 608 with the same address of 192.168.1.3 are simultaneously assigned to both servers and indicate occurrence of an IP address collision. When Proxy Address Resolution Protocol (ARP) exists in each of the first and second servers 601 and 602, if a device 603 with an IP address of 192.168.1.2 in a network to which the second server 602 belongs sends an ARP Request message 604 for device discovery, the device 608 will respond simultaneously with Proxy ARP in the second server 602 for the device 607 with ARP Responses 605 and 606. Accordingly, an IP address cannot be translated into a necessary hardware address, making it impossible to transmit traffic.

Figure 7A:
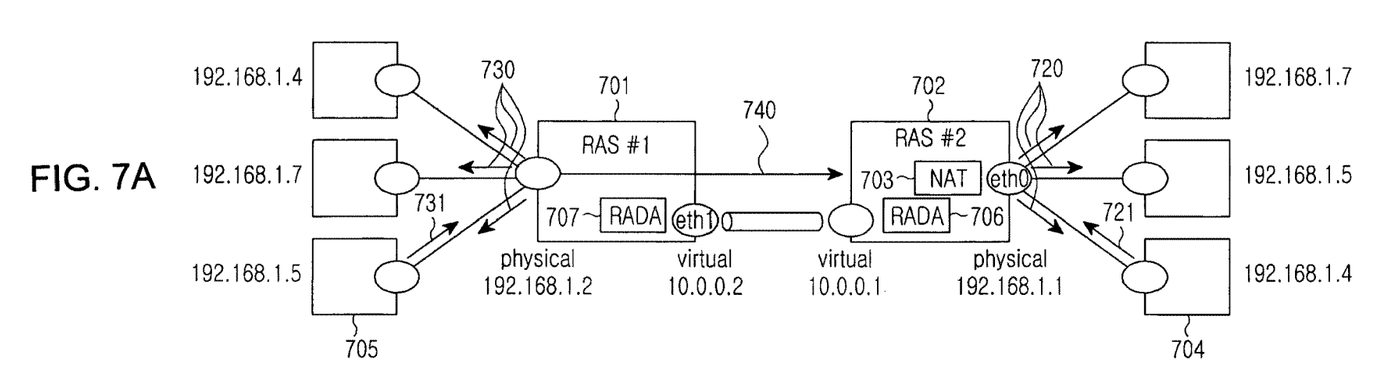
FIGS. 7A to 7C are diagrams illustrating the updating of collided IP addresses, according to an embodiment of the present invention.
Figures 7B, 7C:
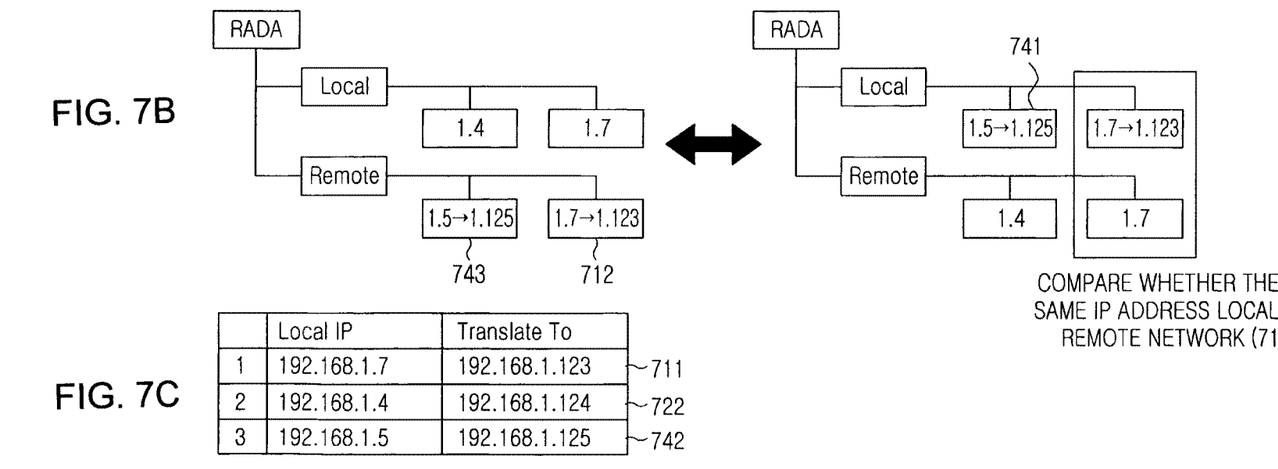

FIGS. 7A to 7C are diagrams illustrating the updating of collided IP addresses, according to an embodiment of the present invention. Specifically, FIG. 7A illustrates two servers 701 and 702 connected through a remote access server. FIG. 7B schematically illustrates IP address information of devices connected to networks of the servers 701 and 702. FIG. 7C illustrates information in a NAT table 703 included in the second server 702.

A RADA device 706 in the second server 702 first obtains a Device Description Document (DDD) for a RADA device 707 in the first server 701. Because IP addresses assigned to virtual interfaces of both sides were assigned by a Virtual Private Network (VPN) server, no collision occurs and thus synchronization between RADA devices can be normally achieved. Like those of virtual interfaces, address spaces related to URLs of DDDs of RADAs 706 and 707 in the first and second servers 701 and 702 may be identical.

The second server 702 generates a NAT table 703 as shown in FIG. 7C, tracking collision of IP addresses. The second server 702 determines in step 710 whether an IP address exists in both a local network and a remote network. If an IP address exists, the second server 702 adds the address to the NAT table 703 for a local network image and translates an IP address of the local network image in the NAT table 703 into a target address in 711. The first server 701 updates the translated IP address in 712.

In 720, the second server 702 broadcasts ARP Probes over a local interface one by one, for IP addresses in a remote network image. If a non-UPnP device 704 responds thereto in step 721, the second server 702 adds responded IP addresses to the NAT table 703 and translates the IP addresses in the local network image so that they correspond to target addresses in the NAT table 703, in 722. Accordingly, even the non-UPnP devices whose IP addresses are collided can respond.

The second server 702 serves as an Application Level Gateway (ALG), for the devices listed in the NAT table 703.

In addition, if a LAN device supports a DHCP FORCERENEW methodology, the second server 702 may send a DHCP FORCERENEW message to the client in order to release the old IP address and reassign a new IP address.

The second server 702 requests the remote network to update the translated 1P addresses.

The NAT table 703 of the second server 702 is updated with IP addresses collided in the remote network.

In 730, the first server 701 broadcasts ARP Probes to the local interface one by one, for IP addresses of the remote network image. If a non-UPnP device 705 responds thereto in step 731, the first server 701 requests the second server 702 to add the collided IP addresses to the NAT table 703 in 740. In response, the second server 702 updates the collided IP addresses in 741, adds the collided IP addresses to the NAT table 703, and translates IP addresses of the local network image in 742. Next, the first server 701 updates the translated IP addresses in 743.

The NAT table 703 should provide IP translation for all traffic including ARP and UPnP. Similarly, Proxy ARP refers to the NAT table 703 when responding to an ARP Probe.

Construction and operation of the IP address collision solving method and apparatus can be accomplished in a remote access service of a UPnP network, according to an embodiment of the present invention. While only the methods of newly assigning an IP address of a collided device in the remote access server when an IP address collision has occurred are disclosed in FIGS. 4 and 5, an alternative method is also possible in which the remote access client can newly assign an IP address of a collided device when a collision of IP addresses has occurred.

Figure 8:
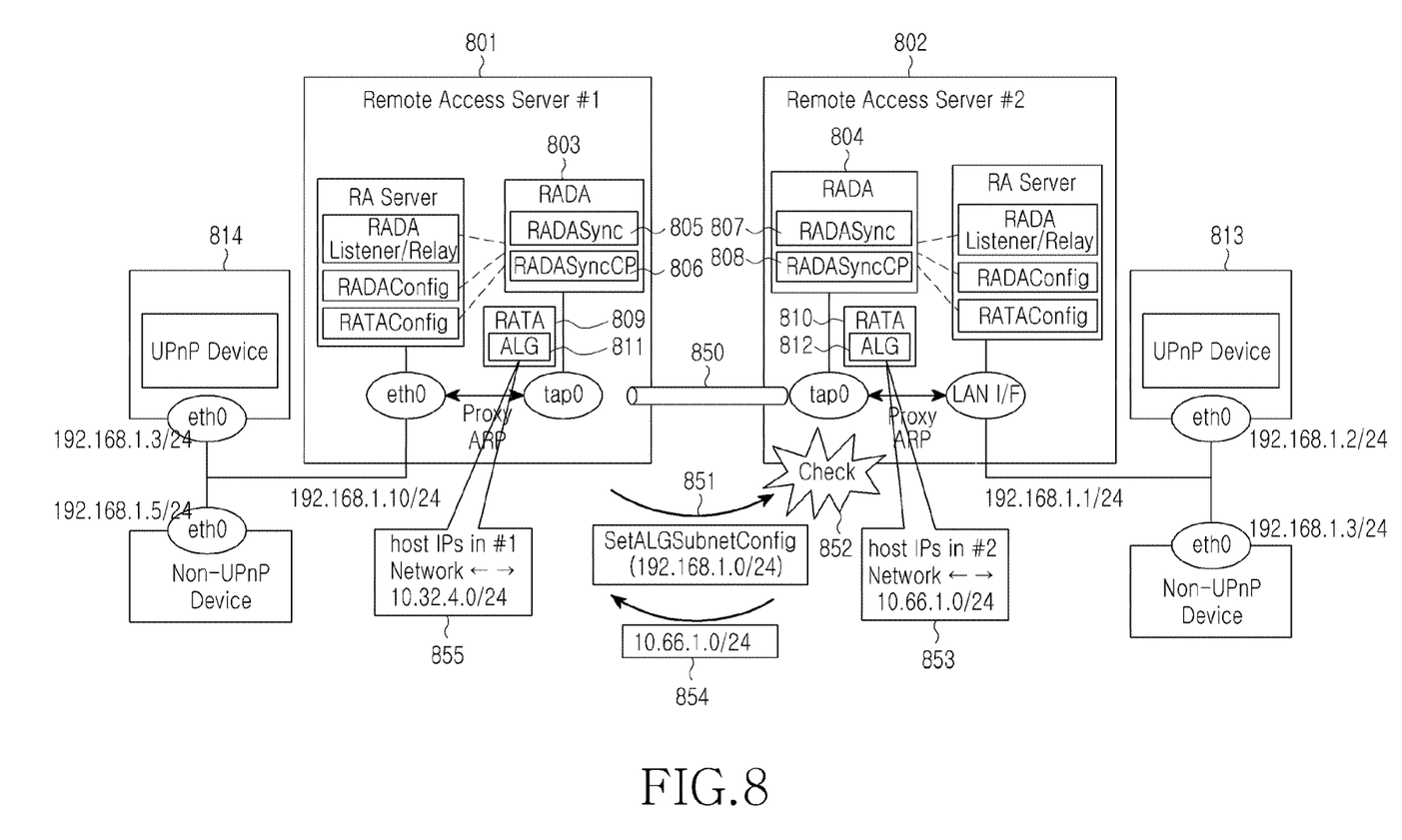
FIG. 8 is diagram illustrating translation of a collided subnet address during a UPnP Home-to-Home remote access service, according to an embodiment of the present invention.

Referring to FIG. 8, a diagram illustrates translation of a collided subnet address during a UPnP Home-to-Home remote access service, according to an embodiment of the present invention. Referring to FIG. 8, a diagram illustrates a remote access system including a first server 801 and a second server 802, wherein the first server 801 connects UPnP device 814 with IP address of 192.168.1.3 and Non-UPnP device with IP address of 192.168.1.5 and the second server 802 connects UPnP device 813 with IP address of 192.168.1.2 and Non-UPnP device with IP address of 192.168.1.3. In FIG. 8, a first server 801 serves as a requestor for Home-to-Home remote access.

If a RA Transport (RAT) channel is generated, a second server 802 can acquire a DDD of a first server 801 according to a general UPnP remote access method. The first server 801 can also acquire a DDD of the second server 802 according to the general UPnP remote access method. The first and second servers 801 and 802 that acquired DDD of each other can use RADASync services 805 and 807 with RADA devices 803 and 804 regardless of an IP collision between their networks. In accordance with an embodiment of the present invention, a SetALGSubnetConfig( ) action can be defined in the RADASync services 805 and 807, and arguments and related state variables of the action are shown in Table 1.

TABLE 1

| Argument | Direction | relatedStateVariable |
|---|---|---|
| CurrentSubnet | IN | SubnetInfo |
| CurrentALGSubnetConfigList | IN | SubnetInfoList |
| NewALGSubnetConfig | OUT | SubnetInfo |

A RADASync CP 806 of the RADA device 803 in the first server 801 invokes the SetALGSubnetConfig( ) action of the RADASync service 807 of the RADA device 804 in the second sever 802. Subnet address information of 192.168.1.0/24 used by a network to which the first server 801 belongs, and a translated subnet address list that is set in an ALG 811 of a RATA 809 in the first server 801, are delivered to the second server 802 in 851. The RADASync service 807 of the RADA device 804 in the second server 802 determines whether a collision occurs between a subnet address of 192.168.1.0/24 to which the first server 801 belongs and a subnet address of 192.168.1.0/24 to which the second server 802 belongs, in 852, and sets a translated subnet address band of an ALG 812 of RATA 810 in the second server 802 when a collision has occurred, in 853. Referring to an ALG's translated subnet address of the first server 801, the RADASync service 807 selects a subnet address of 10.66.1.0/24 of a band that does not collide with the subnet address list. Thereafter, IP addresses of all devices in the network to which the second server 802 belongs are translated into the selected ALG's translated subnet address of 10.66.1.0/24 of the second server 802 and then transmitted to the first server 801.

The RADASync service 807 of the RADA device 804 in the second server 802 sets an ALG's translated address of the second server 802 through the above procedure and then returns the relevant information as a response of the action, in 854. The first server 801 can select a no-collided translated subnet address band (10.32.4.0/24) referring to the translated address included in the response and the translated address list of its ALG 811, in 855. Thereafter, as in the second server 802, IP addresses of all devices in the network to which the first server 801 belongs are translated into the translated subnet address (10.32.4.0/24) of the ALG 811 in the first server 801, and then transmitted to the second server 802.

Through the above process, the first server 801 and the second server 802 can determine translated subnet address bands of the ALGs 811 and 812 that do not collide with each other.

Figure 9:
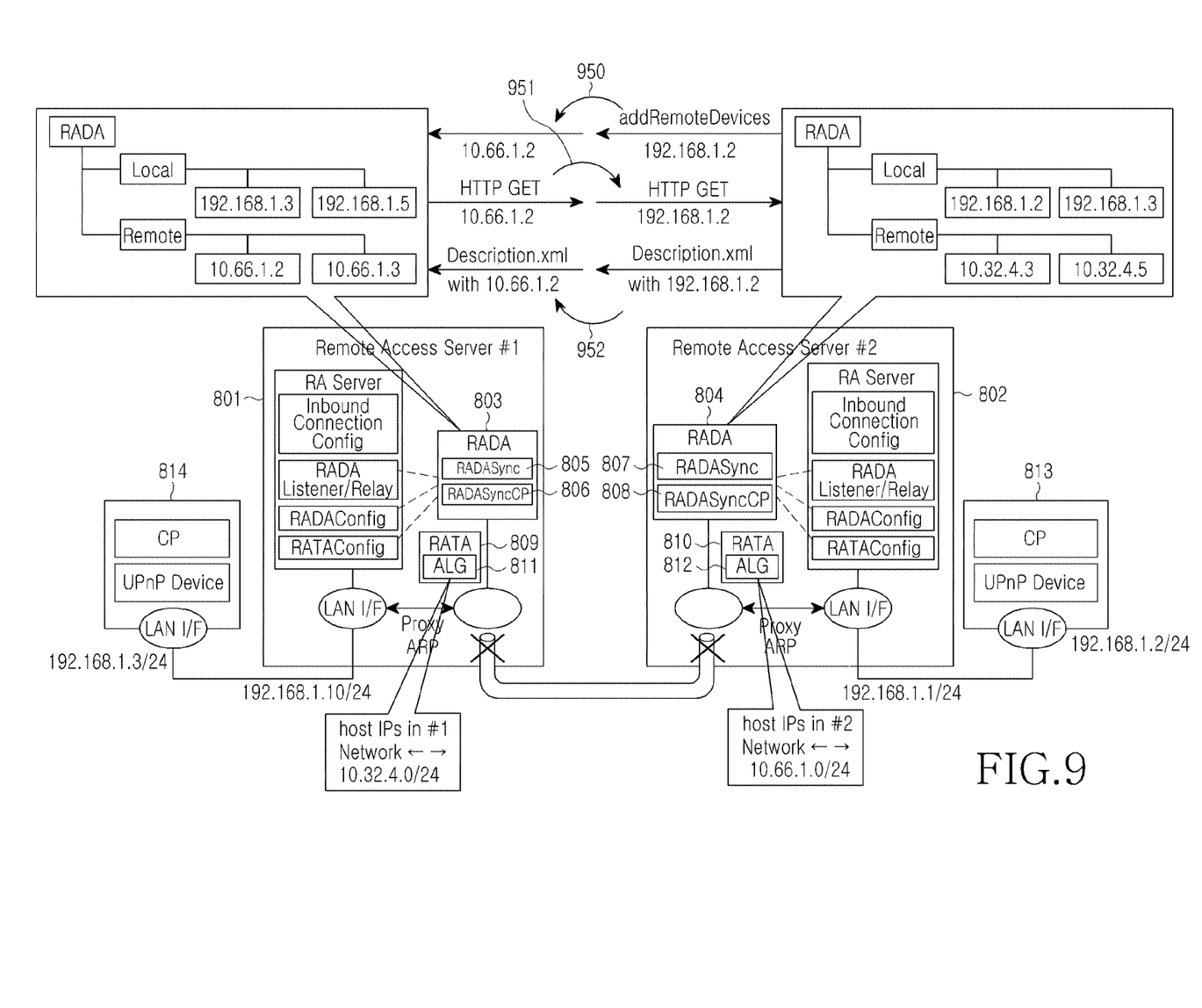
FIG. 9 is a diagram illustrating an operation of an ALG during the operation of FIG. 8, according to an embodiment of the present invention.

FIG. 9 is a diagram illustrating an operation of an ALG during the operation of FIG. 8, according to an embodiment of the present invention. In FIG. 9, the ALG 812 translates a source IP address in an IP packet header transmitted from the inside to the outside into a set translated subnet address band, and replaces an internal subnet address among IP addresses in the IP packet payload with the translated subnet address, in 950. On the contrary, the ALG 812 translates a destination IP address in an IP packet header received from the outside into an internal subnet address, and replaces the translated subnet address among the IP addresses in the IP packet payload with the internal subnet address, in 951. Different translation methods can be used according to types of protocols. For example, in case of an HTTP message, in order to consider a change in a Content Length header value caused by address translation, the ALG 812 can translate an IP address in a body by buffering the entire HTTP message, and then update the Content Length header value by recalculating a body length.

FIG. 9 illustrates operation performed when a device 813 with an IP address of 192.168.1.2 has accessed a network to which the second server 802 belongs, under the environment where the translated subnet address is set through the above process. Specifically, if the device 813 with an IP address of 192.168.1.2 accesses the network, information about the device 813 is added to a local node of a RADA network image of the second server 802, and a RADASync CP 808 of the RADA device 804 in the second server 802 invokes a SOAP action for adding the device information from the first server 801. An ALG of the second server 802 translates an IP address of 192.168.1.2 in the message into a set translated subnet address of 10.66.1.2, and translates a translated address of 10.66.1.2 in an HTTP GET message into an internal IP address of 192.168.1.2. When a Device Description Document in the XML form is returned in response thereto, the ALG translates all internal IP addresses included therein into the translated subnet address, in 952.

The present invention can solve IP address collision, which may occur when devices having the same IP address exist in the network to which a remote access client or a remote access server belongs, in the remote access server using a UPnP protocol.

As is apparent from the foregoing description, the present invention can be applied even when the remote access client or the remote access server has limited resources necessary for IP address translation in an IP header and an IP payload.

Further, the method of the present invention is used as a basic method for solving IP address collision, and only a device other than the device that has acquired IP through DHCP uses IP address translation based on NAT and ALG, thereby minimizing address translation.

In addition, IP collision may be solved using an ARP Probe for both UPnP devices and non-UPnP devices.

While the invention has been shown and described with reference to a certain embodiments thereof, it will be understood by those skilled in the art that various changes in form and detail may be made therein without departing from the spirit and scope of the invention as defined by the appended claims and their equivalents.

What is claimed is:

1. A method for resolving a collision of Internet Protocol (IP) addresses between devices connected to a first remote access server and a second remote access server in a Universal Plug and Play (UPnP) network, the method comprising:
generating, by the first remote access server corresponding to a first network having first IP addresses, a communication remote access transport (RAT) channel connected with the second remote access server;
acquiring, by the first remote access server, device description documents (DDDs) for one or more devices of a second network corresponding to the second remote access server;
receiving, by the first remote access server, second IP addresses of the second network, from the second remote access server;
changing one of the first IP addresses, which is the same as one of the second IP addresses, into a new IP address different from the second IP addresses; and
if the one of the first IP addresses exists in a hypertext transfer protocol (HTTP) message, updating a value of a body of the HTTP message or a value of a header of the HTTP message based on the new IP address.

2. The method of claim 1, wherein the first IP addresses are first subnet addresses of the first network.

3. The method of claim 2, further comprising:
receiving, by the first remote access server, a list of the second IP addresses from the second remote access server.

4. The method of claim 1, wherein changing the one of the first IP addresses comprises:
changing, by an Application Level Gateway (ALG) of the first remote access server, the one of the first IP addresses into the new IP address.

5. The method of claim 1, wherein the change of the one of the first IP addresses is performed by a Dynamic Host Configuration Protocol (DHCP) server.

6. A first remote access server for resolving a collision of Internet Protocol (IP) addresses between the first remote access server and a second remote access server in a Universal Plug and Play (UPnP) network, the first remote access server comprising:
a Remote Access Transport Agent (RATA) configured to generate a communication remote access transport (RAT) channel remotely accessed with the second remote access server;
a Remote Access Discovery Agent (RADA) configured to:
acquire one or more device description documents (DDDs) of a second network corresponding to the second remote access server, and
receive second IP addresses of the second network from the second remote access server; and
an Application Level Gateway (ALG) configured to:
change one of first IP addresses of a first network corresponding to the first remote access server, which is the same as one of the second IP addresses, into a new IP address different from the second IP addresses, and
if the one of the first IP addresses exists in a hypertext transfer protocol (HTTP) message, updating a value of a body of the HTTP message or a value of a header of the HTTP message based on the new IP address.

7. The first remote access server of claim 6, wherein each of the first IP addresses is a first subnet address of the first network.

8. The first remote access server of claim 7, wherein the RADA is further configured to receive a list of the second IP addresses from the second remote access server.

9. A first remote access server for resolving a collision of Internet Protocol (IP) addresses between remote access servers in a Universal Plug and Play (UPnP) network, the first remote access server comprising:

a Remote Access Transport Agent (RATA) configured to generate a communication remote access transport (RAT) channel remotely accessed with a second remote access server; and a Remote Access Discovery Agent (RADA) configured to:

transmit device description documents (DDDs) for one or more devices to the second remote access server using the RAT channel, receive second IP addresses of a second network corresponding to the second remote access server from the second remote access server, and compare first IP addresses of a first network corresponding to the first remote access server with the second IP addresses; and an Application Level Gateway (ALG) configured to:

change the first IP addresses, which is the same as one of the second IP addresses, into new IP addresses different from the second IP addresses, and if the one of the first IP addresses exists in a hypertext transfer protocol (HTTP) message, updating a value of a body of the HTTP message or a value of a header of the HTTP message based on the new IP address.

10. The first remote access server of claim 9, wherein the first IP addresses are first subnet addresses of the first network and the second IP addresses are second subnet addresses of the second network.

11. The first remote access server of claim 10, wherein the ALG is configured to:

compare the first subnet addresses with the second subnet addresses, and change one of the first subnet addresses, which is the same as one of the second subnet addresses, into a new subnet address different from the second subnet addresses.

12. The first remote access server of claim 9, wherein the first remote access server controls a Dynamic Host Configuration Protocol (DHCP) server to change a subnet address of a device included in the first network.

* * * * *